June 17, 1930.  R. J. O'BRIEN  1,763,982
JOURNAL BOX CUSHION
Filed July 25, 1929

Inventor:
Richard J. O'Brien,
by

Patented June 17, 1930

1,763,982

UNITED STATES PATENT OFFICE

RICHARD J. O'BRIEN, OF DEPEW, NEW YORK, ASSIGNOR TO WAUGH EQUIPMENT COMPANY, OF DEPEW, NEW YORK, A CORPORATION OF MAINE

JOURNAL-BOX CUSHION

Application filed July 25, 1929. Serial No. 380,886.

This invention relates to a journal box cushion and concerns itself with an expansible cushion that is positioned between the journal box and a vehicle frame, with means for retaining the same and limiting the expansion thereof so that a good yield and cushioning effect will always be obtained.

In cars used for transporting passengers, noises, vibrations and shocks resulting from contact of the wheel treads and flanges with the running rails are transmitted from the rails up thru the wheels, axles, bearings, equalizers and other parts of the truck to the car under frame and body. By effectively breaking the metallic contact at the various points, such noises, shocks and the like are prevented from reaching the car body and causing annoyance and discomfort to the occupants, especially during night travel in sleeping cars.

The invention comprises the novel structure and combination of parts hereinafter described and more particularly pointed out and defined in the appended claims.

In the accompanying drawings which illustrate a preferred form of this invention and in which similar reference numerals refer to similar features in the different views.

Figure 1:
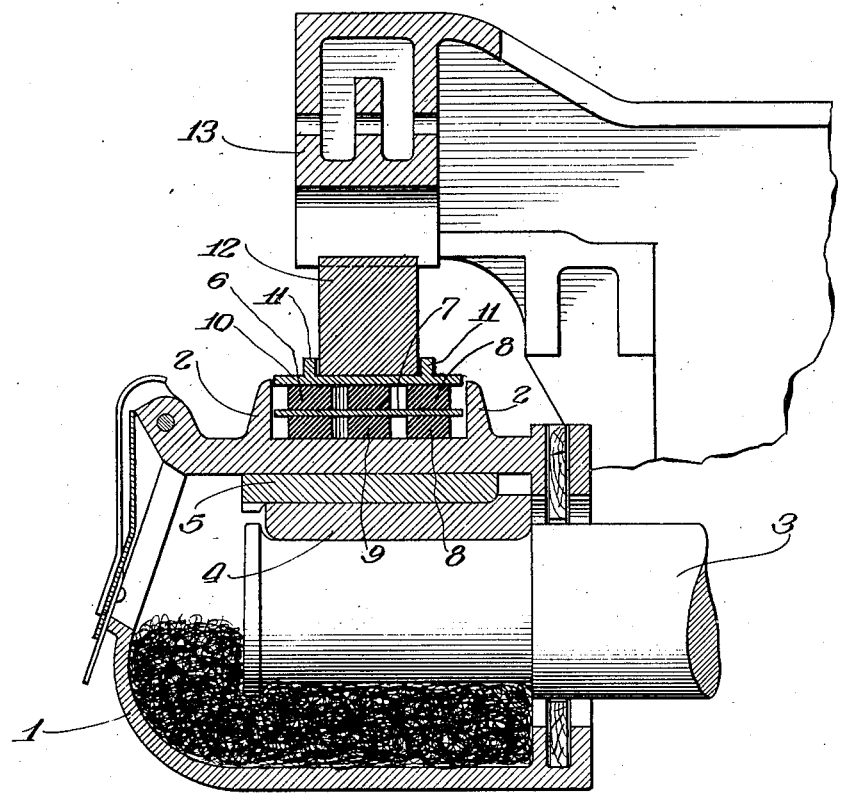
Figure 1 is a longitudinal section view through a journal box with a vehicle frame supported thereon.
Figure 2:
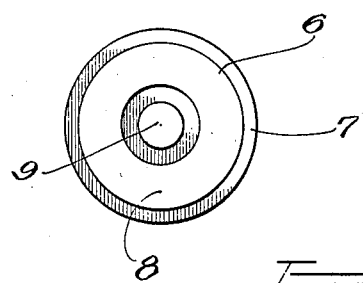
Figure 2 is a top plan view of the cushion.

In the drawings, there is shown a journal box 1 having an upper portion provided with spaced flanges 2, a journal 3 extends into the journal box and engages the usual bearing 4 which is spaced from the wall of the journal box by a filler 5.

According to this invention, a cushion generally denoted by the reference 6 is positioned between the flanges 2. In the illustrated embodiment of this invention, this cushion consists of a central plate 7 with a rubber ring 8 or the like moulded or secured upon each side with a center cylindrical rubber piece 9 secured to the plate in each ring. The groove that is formed between each rubber ring and the center piece allows a predetermined expansion of the two. The flanges 2 also limit the lateral spreading or expansion of the rings 8 with the result that a good yield and cushioning effect is always secured.

A plate 10 is superposed upon the cushion 6 and this plate is provided with a pair of spaced flanges 11 between which a pedestal 12 is located that supports the vehicle frame 13.

From the foregoing it will be apparent that a novel manner of cushioning a vehicle with respect to its journal box has been provided whereby a good yield and cushioning effect is always present.

I am aware that numerous details of construction may be varied through a wide range without departing from the principles of this invention, and I therefore do not purpose limiting the patent granted, otherwise than necessitated by the prior art.

I claim as my invention:

1. The combination with a journal box, of a vehicle frame supported thereon, an expansible cushion element comprising a rubber block and a rubber ring surrounding and spaced therefrom between said frame and box and means for limiting the expansion of said cushion.

2. The combination with a journal box, having spaced upstanding flanges, of a rubber cushion seated between said flanges, a plate upon said cushion a pedestal upon said plate and a frame supported upon said pedestal.

3. The combination with a journal box, of a vehicle frame supported thereon, and expansible cushioning device comprising a central plate with concentric spaced rubber blocks and rings secured to the opposite sides of the plate, said device being located between said frame and box and means for limiting the expansion of the rubber elements.

In testimony whereof I have hereunto subscribed my name at Chicago, Cook County, Illinois.

RICHARD J. O'BRIEN.